(12) United States Patent
Bender et al.

(10) Patent No.: US 8,527,330 B2
(45) Date of Patent: Sep. 3, 2013

(54) SYSTEM AND METHOD FOR CALCULATING SAVINGS

(75) Inventors: Brian Charles Bender, New York, NY (US); Richard A. Chinitz, New York, NY (US); Michael W. Hoherchak, Stamford, CT (US); Lynne Madorsky, Glencoe, IL (US); Irfan S. Pirmohamed, New York, NY (US); Gail Renee Richards, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1169 days.

(21) Appl. No.: 11/284,738

(22) Filed: Nov. 21, 2005

(65) Prior Publication Data

US 2007/0088642 A1    Apr. 19, 2007

Related U.S. Application Data

(60) Provisional application No. 60/726,339, filed on Oct. 13, 2005.

(51) Int. Cl.
G06F 11/00    (2006.01)
G06Q 40/00    (2012.01)

(52) U.S. Cl.
USPC ............................... 705/11; 705/35

(58) Field of Classification Search
USPC ............................. 705/14, 11, 35
See application file for complete search history.

(56) References Cited

U.S. PATENT DOCUMENTS

| 4,885,685 | A | * | 12/1989 | Wolfberg et al. | 705/14 |
| 5,021,953 | A | * | 6/1991 | Webber et al. | 705/6 |
| 6,009,408 | A | * | 12/1999 | Buchanan | 705/5 |
| 6,823,054 | B1 | * | 11/2004 | Suhm et al. | 379/134 |
| 2006/0253486 | A1 | * | 11/2006 | Ford | 707/102 |

OTHER PUBLICATIONS

PR_Newswire; "Cognos(R) and Sabre's GetThere Deliver High-Flying Savings to The Fortune 1000." Aug. 13, 2001; Suppler No. 77128784.*

Ballard, Tanya N. "Travel Defense Hits Turbulence on Takeoff"; Government Executive; Sep. 1, 2003; Supplier No. 211496742.*

PR_Newswire_2; "Thrifty Car Rental Enhances Features of Thrifty.com Web Site; Booking Online Has Never Been Easier"; Apr. 16, 2001; Suppler No. 73230200.*

* cited by examiner

Primary Examiner — Edward Chang
(74) Attorney, Agent, or Firm — Snell & Wilmer L.L.P.

(57) ABSTRACT

A system and method for calculating savings using a savings calculator for calculating savings realized over a period of time for several travel-related categories of expenses using respective pre-defined formulas and for producing a savings summary report and worksheets.

18 Claims, 18 Drawing Sheets

Online Adoption

| | | |
|---|---|---|
| Overview & Positioning | Clients realize lower transaction fees by moving clients online<br>■ Driven by difference between offline (traditional) booking fee and online (interactive) booking fee<br>■ American Express offers tools, training programs, and initiatives to encourage travellers to book online | Benefits include:<br>■ Historically, a 10 point shift in online adoption drives an additional 0.5% of savings as a percent of Air Spend |
| Value Methodology | Value from lower transaction fees by moving online<br><br>Online transaction volume ↓ X Change in adoption rate ↓ X Difference between agent assisted and online transaction fee ↓<br><br>#Interactive Max Air Transactions X (Adoption %$_1$ − Adoption %$_0$) X (Fee$_{Trad\,1}$ − Fee$_{Online\,1}$)<br><br>Where:<br>Adoption % = # Interactive Max Air Transactions / (# Interactive Max Air Transactions + # Traditional Max Air Transactions)<br>Fee = Transaction Fees / # Max Air Transactions | |
| Inputs & Assumptions | Field Inputs<br># Traditional Max Air Transactions, current period (Note 1)<br># Interactive Max Air Transactions, current period (Note 1)<br># Traditional Max Air Transactions, base period (Note 1)<br># Interactive Max Air Transactions, base period (Note 1)<br>Traditional Transaction Fees, current period<br>Interactive Transaction Fees, current period<br>Note 1: If the client has a customized definition of transaction, calculate transaction volume using definition in the contract | Source: CTMIS<br>Business Travel P&L − All Channels |

Online Adoption

| | |
|---|---|
| Overview & Positioning | Clients realize lower transaction fees by moving clients online<br>• Driven by difference between offline (traditional) booking fee and online (interactive) booking fee<br>• American Express offers tools, training programs, and initiatives to encourage travellers to book online<br><br>Benefits include:<br>• Historically, a 10 point shift in online adoption drives an additional 0.5% of savings as a percent of Air Spend |
| Value Methodology | Value from lower transaction fees by moving online<br><br>Online transaction volume × Change in adoption rate × Difference between agent assisted and online transaction fee<br><br>#Interactive Max Air Transactions × (Adoption $\%_1$ − Adoption $\%_0$) × (Fee$_{Trad\ 1}$ − Fee$_{Online\ 1}$)<br><br>Where:<br>Adoption % = # Interactive Max Air Transactions / (# Interactive Max Air Transactions + # Traditional Max Air Transactions)<br>Fee = Transaction Fees / # Max Air Transactions |
| Inputs & Assumptions | <u>Field Inputs</u><br># Traditional Max Air Transactions, current period (Note 1)<br># Interactive Max Air Transactions, current period (Note 1)<br># Traditional Max Air Transactions, base period (Note 1)<br># Interactive Max Air Transactions, base period (Note 1)<br>Traditional Transaction Fees, current period<br>Interactive Transaction Fees, current period<br><br>Note 1: If the client has a customized definition of transaction, calculate transaction volume using definition in the contract<br><br>Source: CTMIS<br>Business Travel P&L – All Channels |

FIG. 3A

Non-refundable Tickets

| | |
|---|---|
| Overview & Positioning | Clients realize lower average ticket prices by purchasing tickets with restrictions<br>• A source of savings from Compliance Management<br>• American Express has significant experience creating and managing best-in-class travel policies<br>• Access to pre-travel data allows for monitoring data for policy compliance and the ability to require out-of-policy travellers to adjust travel arrangements<br><br>Benefits include:<br>• Historical data suggests a 1 point shift towards discounted fare would drive an additional 0.6% of savings as a percent of air spend |
| Value Methodology | Value from increased use of discount tickets<br><br>$$\underbrace{\sum_{i\,=\,economy}^{First}}_{\text{Savings for each class added together}} \left[ \underbrace{\left( NR\%_{Current} - NR\%_{Base} \right)_i}_{\substack{\text{Change in percent} \\ \text{of non refundable} \\ \text{tickets}}} \times \underbrace{\left( \text{Avg. Price}_{Ref,\,Current} - \text{Avg. Price}_{NonRef,\,Current} \right)_i}_{\substack{\text{Difference between} \\ \text{refundable and} \\ \text{non-fundable tickets}}} \times \underbrace{\#\,Tickets_i}_{\substack{\text{Number of} \\ \text{tickets in the} \\ \text{particular class}}} \right]_{\substack{\text{by class of} \\ \text{service}}}$$<br><br>Savings from a class of service     For each class of service grouping |
| Inputs & Assumptions | Field Inputs<br>Refundable $ Volume, current period<br>Refundable count, current period<br>Non-Ref $ Volume, current period<br>Non-Ref count, current period<br>Refundable count, base period<br>Non-Ref count, base period<br><br>Source: Website<br>Non-Refundable Reporting System |

FIG. 3C

Ticket Tracker Refundable

| | |
|---|---|
| Overview & Positioning | Ticket Tracker Refundable is a fully automated end-to-end unused e-ticket management solution that identifies and reclaims lost travel dollars by:<br>• Finding and processing unused refundable e-tickets<br>• Prompting travelers holding restrictive non-refundable e-tickets to take action prior to the departure date if travel plans have changed<br>• Calculating and delivering unused non-refundable e-ticket data to the traveler's profile for future use | Providing:<br>• A completely automated process - from finding the unused e-tickets through the refund process.<br>• A flexible "aging" choice allows the client to control the number of days between the last date of travel and the date the tool begins to process any ticket.<br>• Detailed reports to provide important unused e-ticket details.<br>• Automatic reconciliation to the original form of payment is available or consolidation of refunds to a central source is also an option.<br>• Identification of unused e-tickets historically for up to 12 months. |
| Value Methodology | Net value of tickets recovered<br><br>Savings for each month of a period added together<br><br># months in period $\longrightarrow \sum_{i=1}$ [ | Current savings from Ticket Tracker in a particular month<br><br>Current Gain Share Rate × Refund value of Current Refunds Accepted<br><br>+<br><br>Historical savings from Ticket Tracker in a particular month<br><br>Historical Gain Share Rate × Refund value of Historical Refunds Accepted ]$_i$<br><br>Note: Gain Share Rate is typically 0.8 for tickets less than 180 days old and 0.5 for tickets more than 180 days old. Varies by client contract |
| Inputs & Assumptions | Refund Value, Current Refunds Accepted<br>Refund Value, Historical Refunds Accepted<br>Gain Share or $, Current Refunds Accepted<br>Gain Share or $, Historical Refunds Accepted | Source: Ticket Tracker Billing<br>Unused Ticket Management Solutions – Monthly Summary<br>(note: column header may read "Billing %" not "Gain Share or $")<br>(note: column header may read "Billing %" not "Gain Share or $") |

FIG. 3D

Online Adoption and Platform Optimization example

The worksheet shows backup calculations and data for the savings categories

SavingsCalculator data entry worksheets

The Advance Ticket Purchase Worksheet is an example of a data entry and calculation worksheet

1 Follow step-by-step to copy data from the source report and paste it into the data block Advance Ticket Purchase data chart
From Report 1070SE, Advance Purchase Summary Instructions:
The rows and columns of the Current Period data block mirrors the data block on report R1070SE.
Highlight cells E13:H17 on current period report R1070SE and press <Ctrl><C>
Highlight cell C14 on this tab
While holding the <Alt> key, type E, S, V
Highlight cells F13:F17 on base period report R1070SE and press <Ctrl><C>
Highlight cell G14 on this tab
While holding the <Alt> key, type E, S, V

| Advance Grouping | # invoices | Invoices % | Current Period Amount | Average ticket price | Base period Invoices % | Invoices % change | Savings |
|---|---|---|---|---|---|---|---|
| <= 3 days | 3,810 | 22% | $ 2,704,145 | $ 710 | 25% | -3.0% | $ 374,667 |
| 4 to 7 days | 4,945 | 28% | $ 3,247,218 | $ 657 | 27% | 1.2% | $ (134,057) |
| 8 to 14 days | 4,045 | 23% | $ 2,405,182 | $ 595 | 23% | 0.2% | $ (25,119) |
| 15 to 21 days | 2,140 | 12% | $ 1,182,083 | $ 552 | 10% | 2.2% | $ (217,497) |
| >21 days | 2,650 | 15% | $ 1,570,086 | $ 592 | 16% | -0.6% | $ 64,562 |
| Total | 17,590 | | | | | Savings | $ 62,557 |

Return to Data Input Worksheet    Return to Homepage

2 Note that the worksheet data blocks are set up exactly like the source reports, saving data entry time

3 Data entry worksheets also act as calculation worksheets

FIG. 3F

What to do with the Savings Summary

The Savings Summary shows realized period over period savings in each category. Using these numbers in the Business Review helps demonstrate the value delivered.

Formula Translation – Other Fees Savings Formulas

*Platform Optimization*

- Value of lowering transaction fees and platform shifts

Number of online transactions X Reduction in Online Transaction Fee
+ Number of offline transactions X Reduction in Offline Transaction Fee $\# trx_{Online1}$ X (Transaction Cost$_{Online1}$ – Transaction Cost$_{Online0}$)
+ $\# trx_{Trad1}$ X (Transaction Cost$_{Trad1}$ – Transaction Cost$_{Trad0}$)

FIG. 10

SYSTEM AND METHOD FOR CALCULATING SAVINGS

CROSS REFERENCE TO RELATED APPLICATIONS

This application claims priority to, and the benefit of, U.S. Provisional Patent Application Ser. No. 60/726,339, filed Oct. 13, 2005, which is hereby incorporated by reference in its entirety.

BACKGROUND OF THE INVENTION

1. Field of the Invention

The present invention generally relates to a savings calculator, and more particularly to a system and method for calculating savings realized over a period of time for several categories useful to a manager of travel related services.

2. Related Art

In the past, providers of travel related services to travel customers would operate using a transactional business model, that is, the service providers would charge a commission related to an individual transaction requested by the travel customer.

Recently, there has been a move by the providers of travel related services from the transactional business model to an advisory service model.

In the advisory service model, the relationship between the provider and the customer is based on the value provided to the travel customer rather than merely charging a commission per transaction.

Given the foregoing, what is needed is a system, method and computer program product that would allow a manager of such a relationship, in a standardized fashion, to evaluate and quantify the value brought to a customer over a period of time.

BRIEF DESCRIPTION OF THE INVENTION

The present invention meets the above-identified needs by providing a system, method and computer program product for calculating savings.

An advantage of the present invention is that it furnishes travel service providers with a tool for producing a savings summary report for a travel customer. The manager, using this tool, can present to the customer the actual savings provided during a period of time of interest. This savings summary report also provides the travel customer guidance on how to save even more.

Another advantage of the present invention is that it affords the provider's service managers a tool with which they can quantify the value of their company's service to a customer over a particular period of time.

A further advantage of the present invention is that it provides a tool that guides its users step by step through the process of collecting the raw data necessary to produce a standardized savings summary report. Since such users are especially likely to be managers of relationships with particular clients, and not necessarily accountants, this benefit will make preparation of an effective report both faster and easier.

Features of the system, method, and computer program product for calculating savings realized over a period of time for a plurality of categories of expenses include the receiving of raw data input from a user, the categorizing of the raw data into a plurality of variables, the calculating of the savings realized over the period of time for the plurality of categories based on a respective plurality of pre-defined formulas having as input the plurality of variables, the producing of a savings summary report based on the calculated savings realized over the period of time for the plurality of categories, and the outputting of the produced savings summary report.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 3A through 3D show examples of glossary output screens for different categories of expenses produced by the savings calculator according to one embodiment of the present invention.

FIGS. 3E and 3F show examples of worksheet output screens for different savings categories of expenses produced by the savings calculator according to one embodiment of the present invention.

FIGS. 7-10 show examples of variables, definitions, and formulas used by the present invention, as input data, derived data, or output data.

DETAILED DESCRIPTION

I. Overview

The present invention is directed to a system, method and computer program product for calculating savings. The present invention is now described in more detail herein in terms of the above exemplary description. This is for convenience only and is not intended to limit the application of the present invention. In fact, after reading the following description, it will be apparent to one skilled in the relevant arts how to implement the following invention in alternative embodiments.

The terms "customer," "travel customer," "manager," "provider," "client," and "service provider," and/or the plural form of these terms are used interchangeably throughout herein to refer to those persons or entities capable of accessing, using, being affected by and/or benefiting from the tool that the present invention provides for calculating savings.

The invention is intended to be of particular utility to an organization (e.g., a large corporation), in which it may be difficult to measure savings due to the large size of the entity and to the difficulties of gathering all of the relevant data and of analyzing that data in order to obtain guidance as to how to improve savings performance.

In what follows, an example of the invention as applied to travel expenditures will be explained with reference to the figures.

II. System

Figure 1:
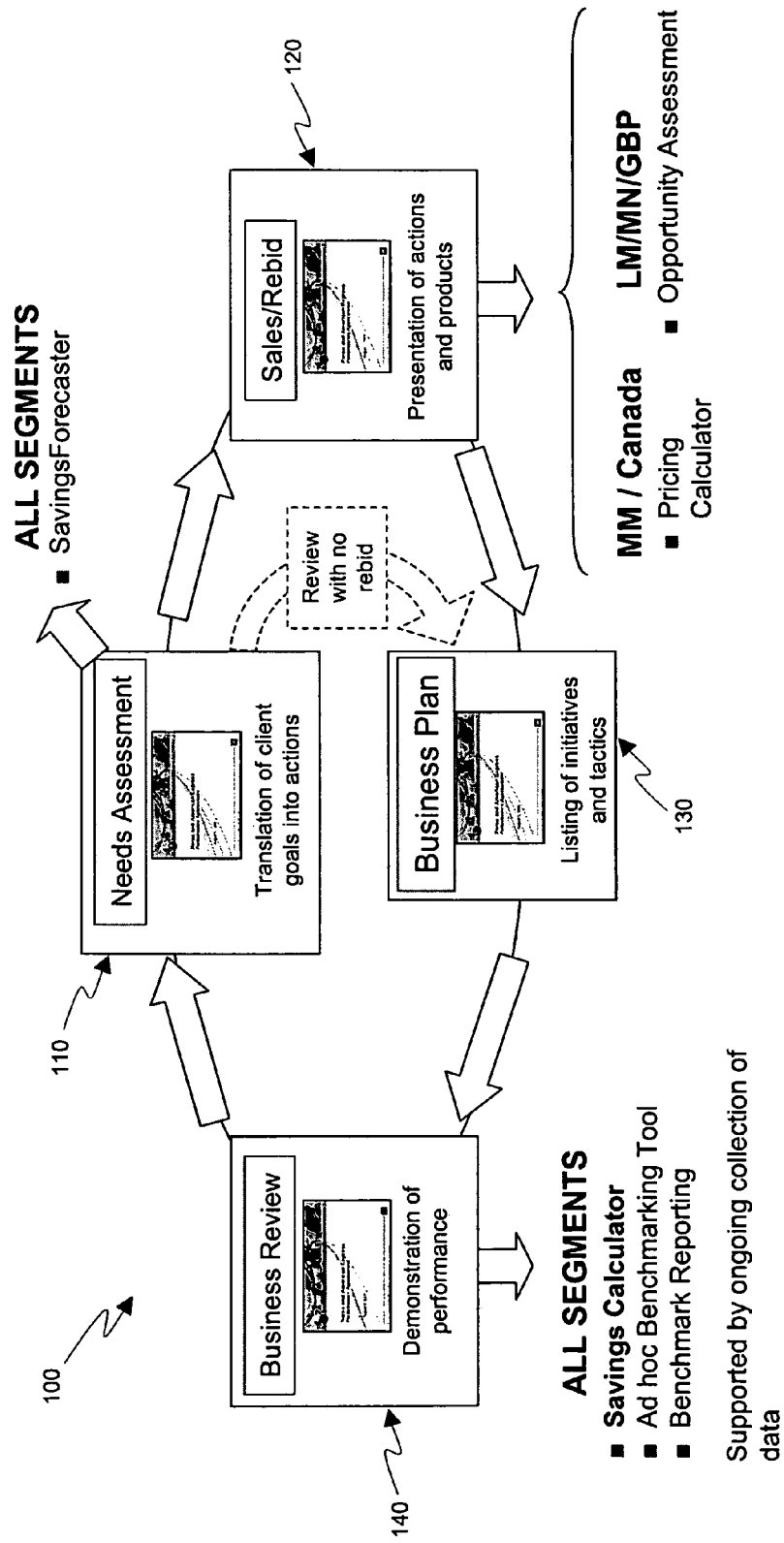
FIG. 1 is a diagram showing an example of a customer's performance assessment report in the preparation of which the savings calculator could be used according to one embodiment of the present invention.

Referring to FIG. 1, a system diagram 100 is shown as an example of a procedure in which the savings calculator is used according to an embodiment of the present invention.

A customer's performance assessment report 100 typically includes several reports, for example, a needs assessment report 110 translating client goals (e.g., money savings, control over who travels, etc.) into actions (e.g., reduce transaction costs, restricting class of travel, etc.), a sales/re-bid report 120 presenting the proposed actions and available products that can be used in achieving those goals (e.g., a ticket tracker such as the method under the service mark TICKET TRAX®, a registered service mark of American Express Company, for finding and processing unused refundable e-tickets), a business plan report 130 listing initiatives (e.g., move the customer on-line) and tactics (e.g., training programs), and a business review report 140 demonstrating performance. The savings calculator is used as a tool in the preparation of business review report 140.

Figure 2:
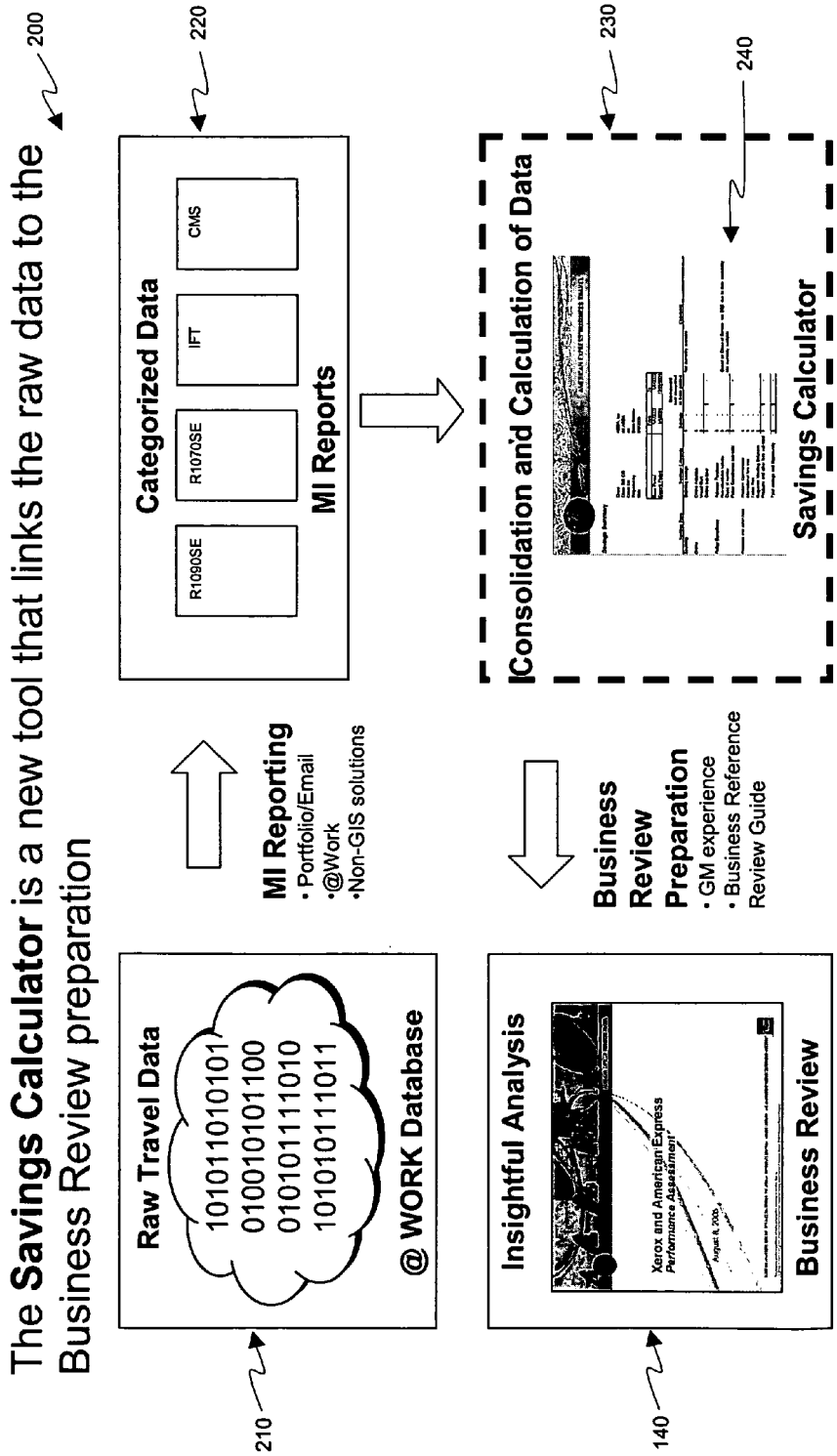
FIG. 2 is a diagram showing how the savings calculator is used to link raw data to a business review according to one embodiment of the present invention.

Referring to FIG. 2, a system diagram 200 is shown as an example of how the savings calculator 230 is used in the preparation of the business review report 140.

Figure 2A:
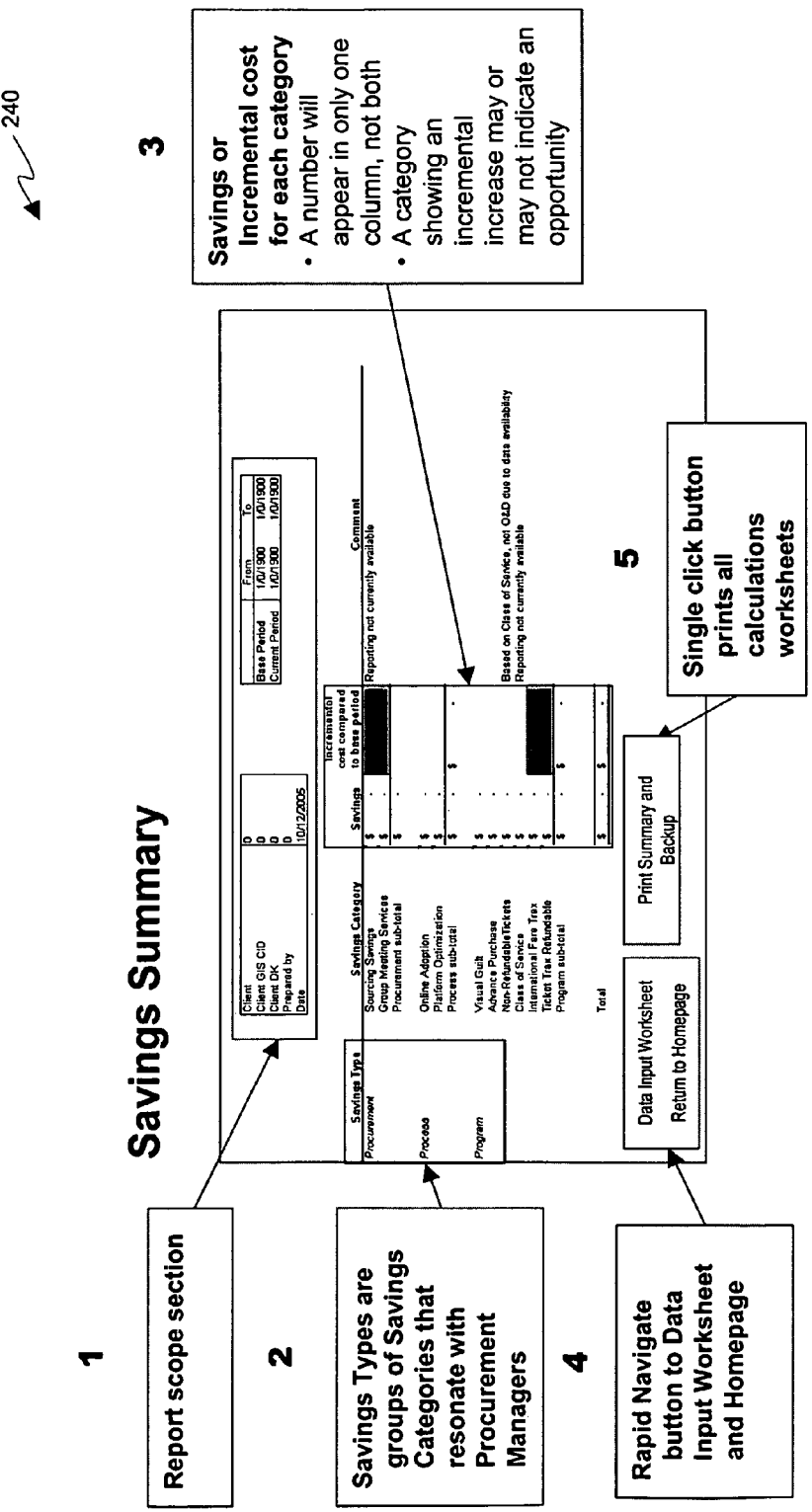
FIG. 2A shows an example of a savings summary report according to one embodiment of the present invention.

Input data for savings calculator 230 is obtained from multiple reports 220 that the provider of travel related services creates in the normal course of its business, typically using raw travel data 210 residing in multiple databases. Savings calculator 230 uses this data to produce a savings summary report 240 as is described below and shown in FIG. 2A. Savings summary report 240 is then included in business review report 140.

Figure 3:
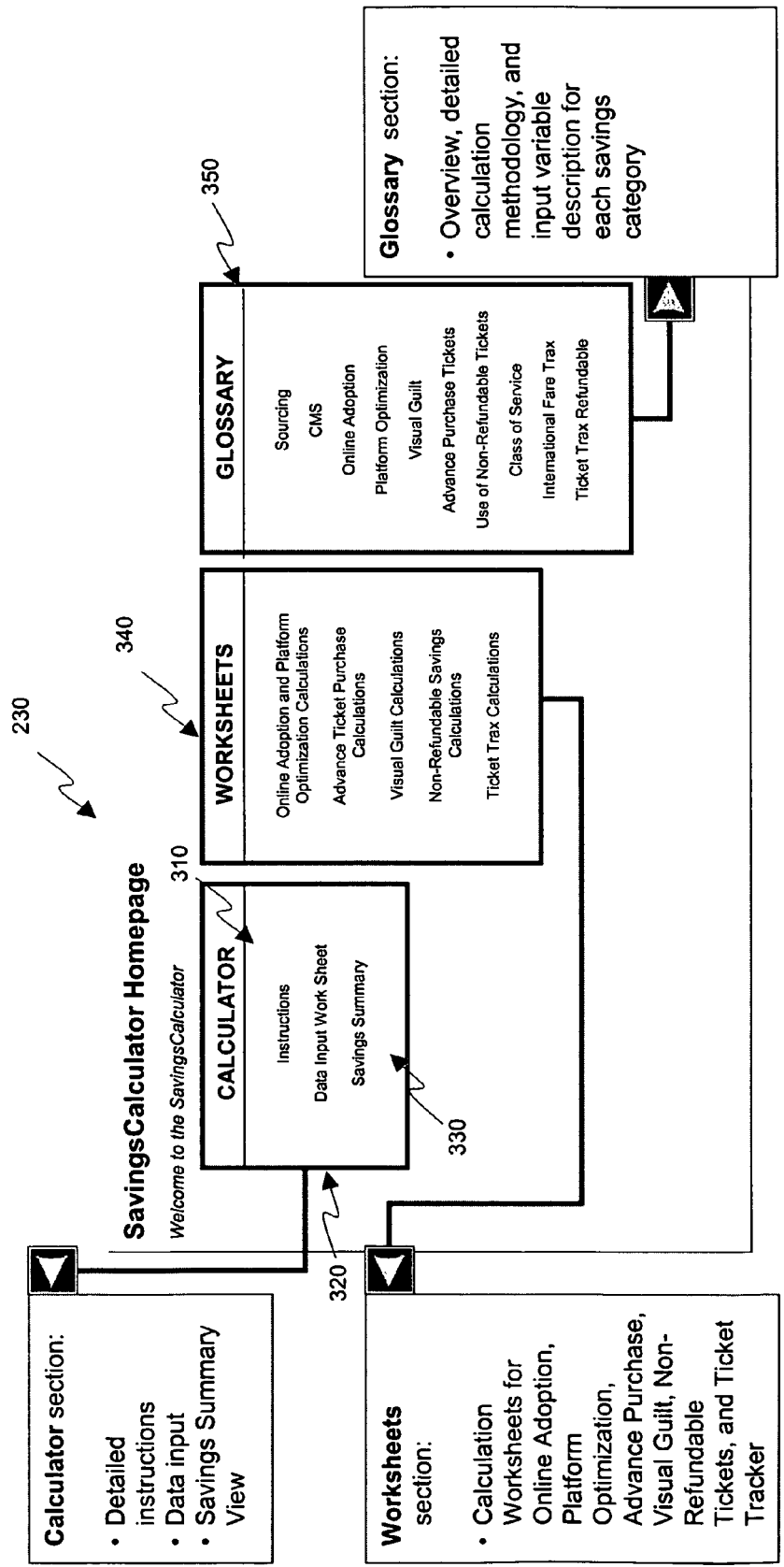
FIG. 3 is a diagram showing features of the savings calculator according to one embodiment of the present invention.

Referring to FIG. 3, features of savings calculator 230 according to an embodiment of the present invention will be described with reference to an example of a graphical-unit interface (GUI) display of the savings calculator homepage.

Savings calculator 230 provides the user, usually a manager, with detailed instructions on how to gather the necessary data by selecting the "instructions" button 310 on the GUI display.

Further, by selecting the "data input worksheet" button 320, the user is guided through the data entry, as is described below in detail. When the data entry is completed, selection of the "savings summary" button 330 causes a savings summary report showing savings in several categories of expenses to be generated and displayed.

Figure 3B:
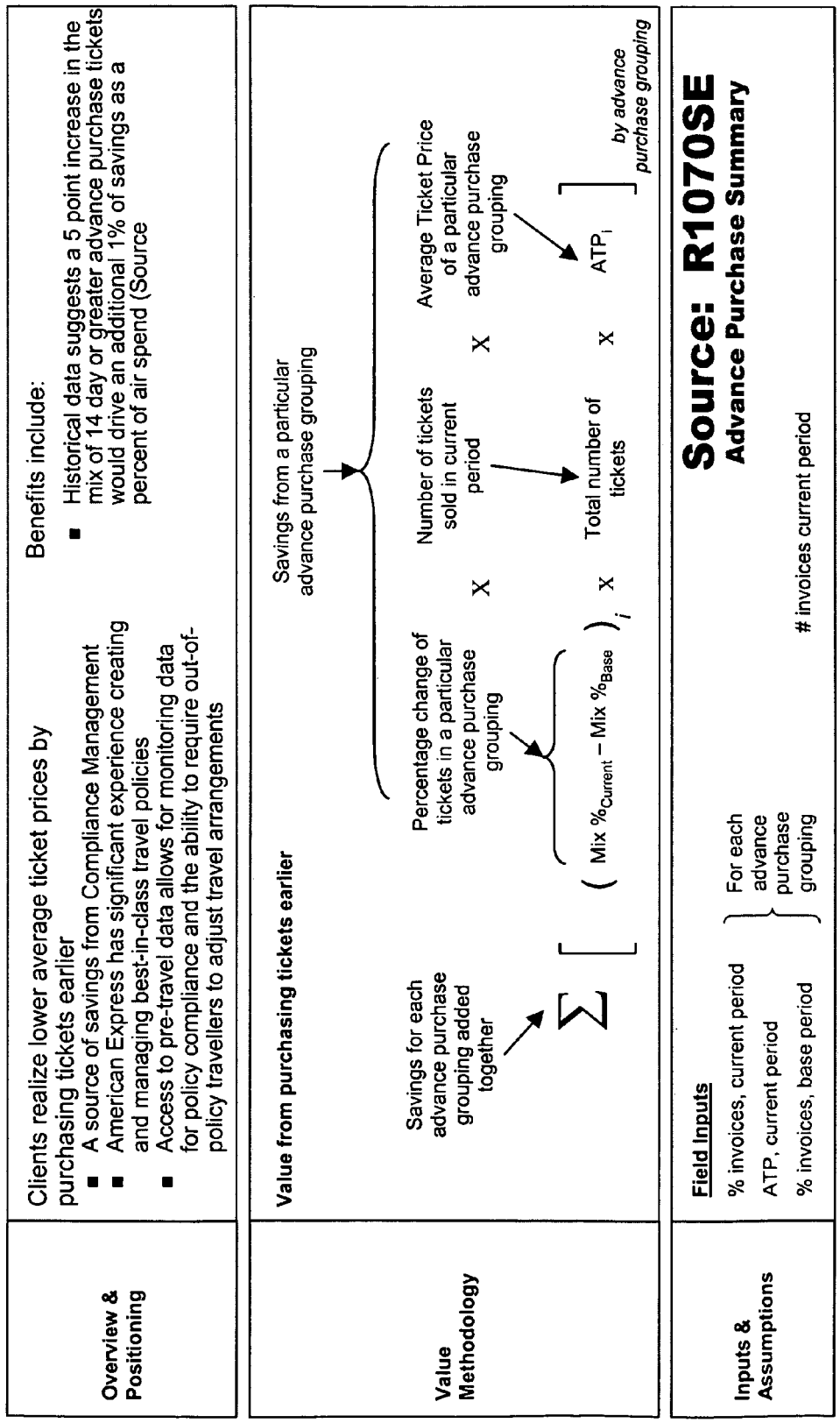
Figure 3E:
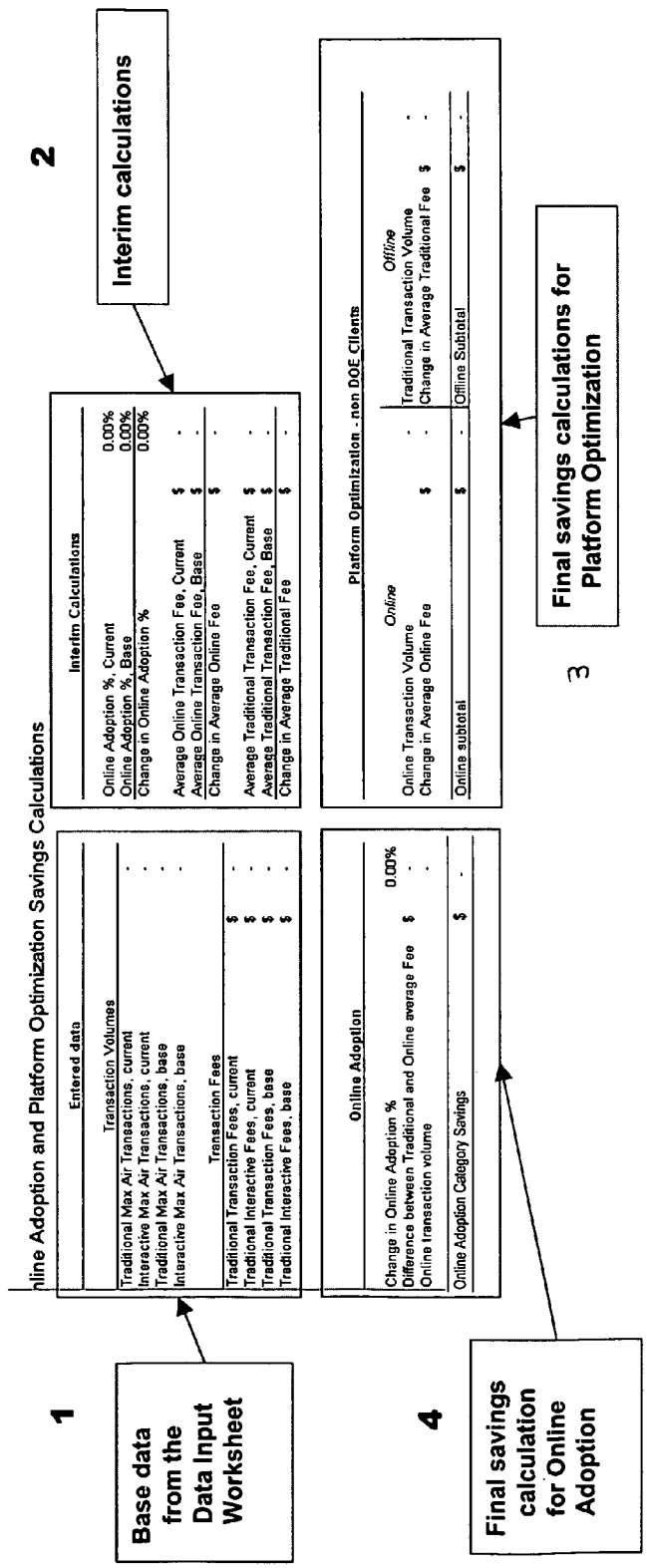

Worksheets section 340 of savings calculator 230 provides the user with a display of interim calculations and data for each savings category. FIGS. 3E and 3F show examples of worksheet output screens produced by the savings calculator.

Furthermore, glossary section 350 includes rapid navigate buttons that, when activated, explain the variable inputs needed and the respective formulas for calculating the savings for each of the savings categories. The savings categories and their respective formulas are described below in detail.

These glossaries, which include the verbal and mathematical explanations of the inputs and formulas utilized, serve the important purpose of helping to improve the users' understanding of Savings Calculator 230, and hence increase also their confidence in the validity of its results.

FIG. 3A shows an example of a glossary output screen for the "Online Adoption" savings category. As can be seen, the calculation based on this screen multiplies on-line transaction volume by a change in adoption rate (the percentage of purchase that are made on-line) and the difference in fee as between on-line and other purchases, to obtain the savings achievable by increasing on-line purchases and reducing other types of purchases. FIG. 3B shows an example of a glossary output screen for the "Advance Purchases" savings category, relating to a similar calculation, in which a savings based on increasing early group purchases (the savings from each advance purchase grouping are added together to obtain the total savings). FIG. 3C shows an example of a glossary output screen for the "Non-Refundable Tickets" savings category, in which, for each ticket class (e.g., economy, business, first class, etc.) the savings achieved by purchasing non-refundable rather than refundable tickets is calculated, and the savings for the different ticket classes are added together. FIG. 3D shows an example of the glossary output screen for the "Ticket Tracker Refundable" savings category, in which the net savings realized by obtaining refunds on unused tickets are tallied. As can be seen, each of these glossary views provides an overview section, a value methodology section, and an inputs and assumptions section for the corresponding savings category.

Figure 4:
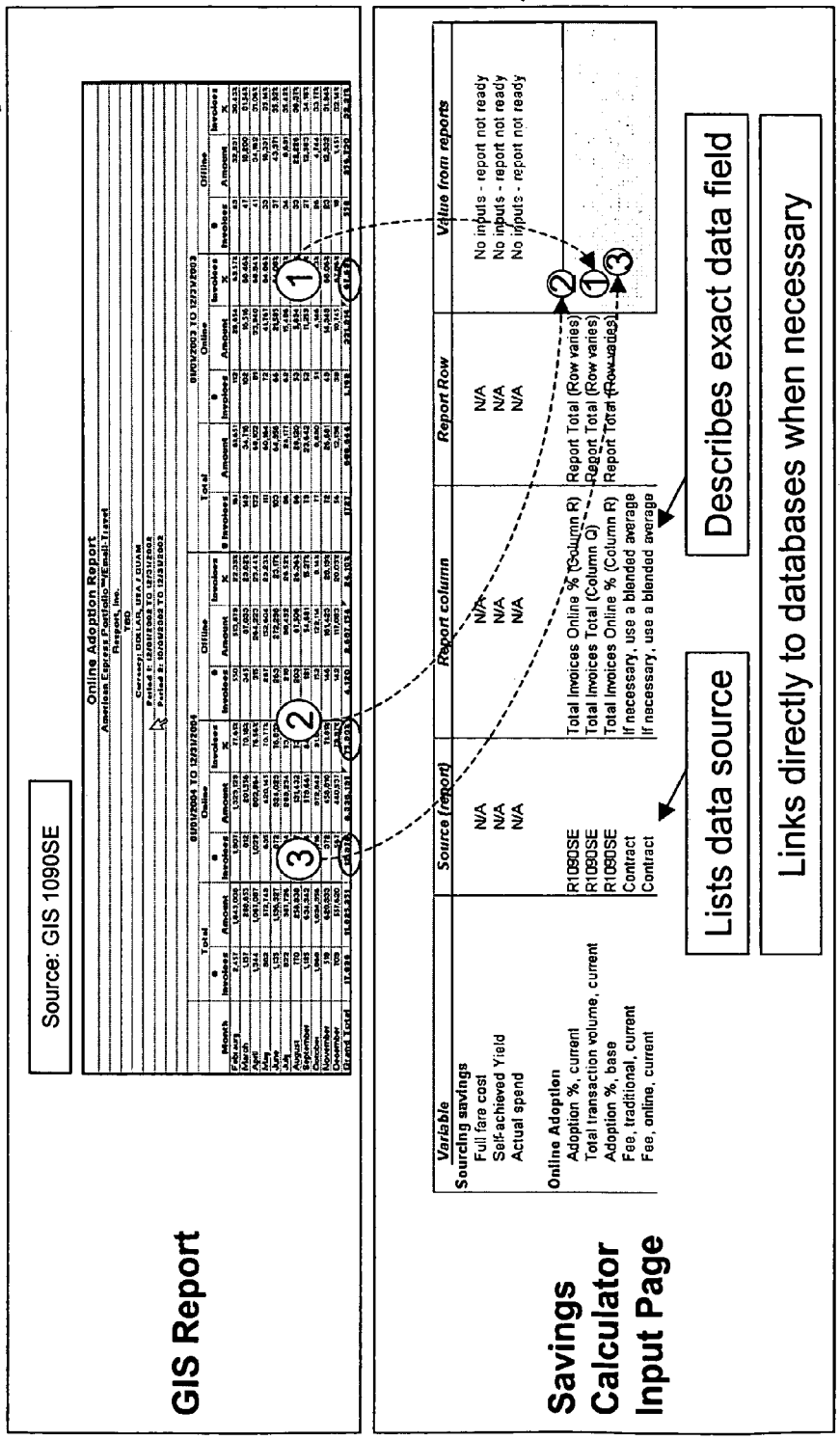
FIG. 4 is a diagram showing a benefit of the savings calculator according to one embodiment of the present invention.

FIG. 4 shows an example of how the user is guided to the relevant report fields of the reports 220, to find data required for input to the input pages of savings calculator 230. For example, for the input variable "Total transaction volume, current," savings calculator 230 shows the user the value for this variable.

This feature results in time savings, since the user is instructed by savings calculator 230 itself where to get the data needed for each input field. Since all users thus employ the same data from the same reports as inputs for savings calculator 230, this feature also produces the important benefit that different users' reports are consistent throughout the organization.

Figure 5:
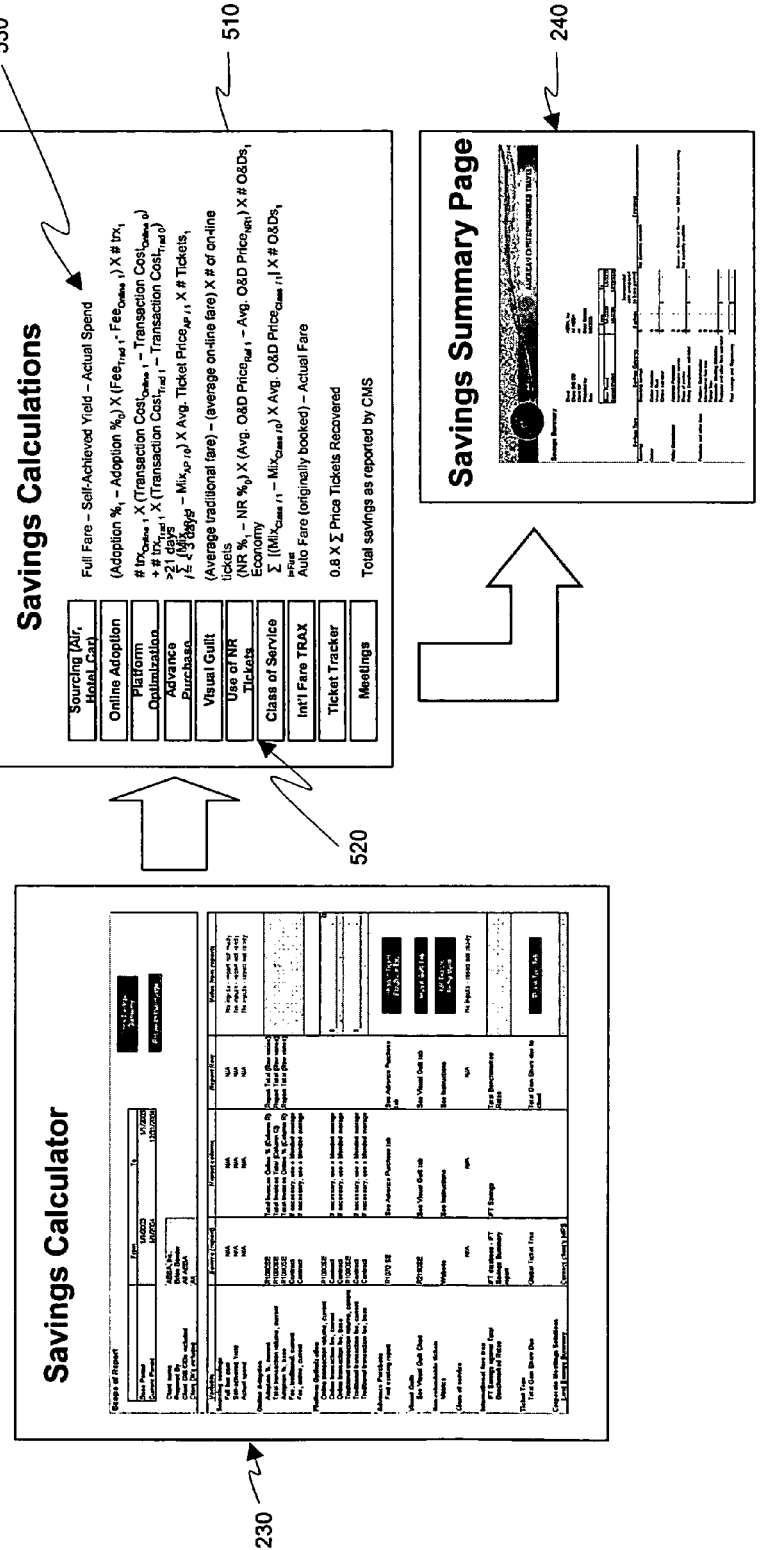
FIG. 5 is a diagram showing how the savings calculator produces a saving summary report according to one embodiment of the present invention.

FIG. 5 shows an example of how savings calculator 230 uses saving calculations 510 for calculating the savings realized over a period of time for several categories of expenses 520 using respective pre-defined formulas 530 to produce the savings summary report 240.

Figure 6:
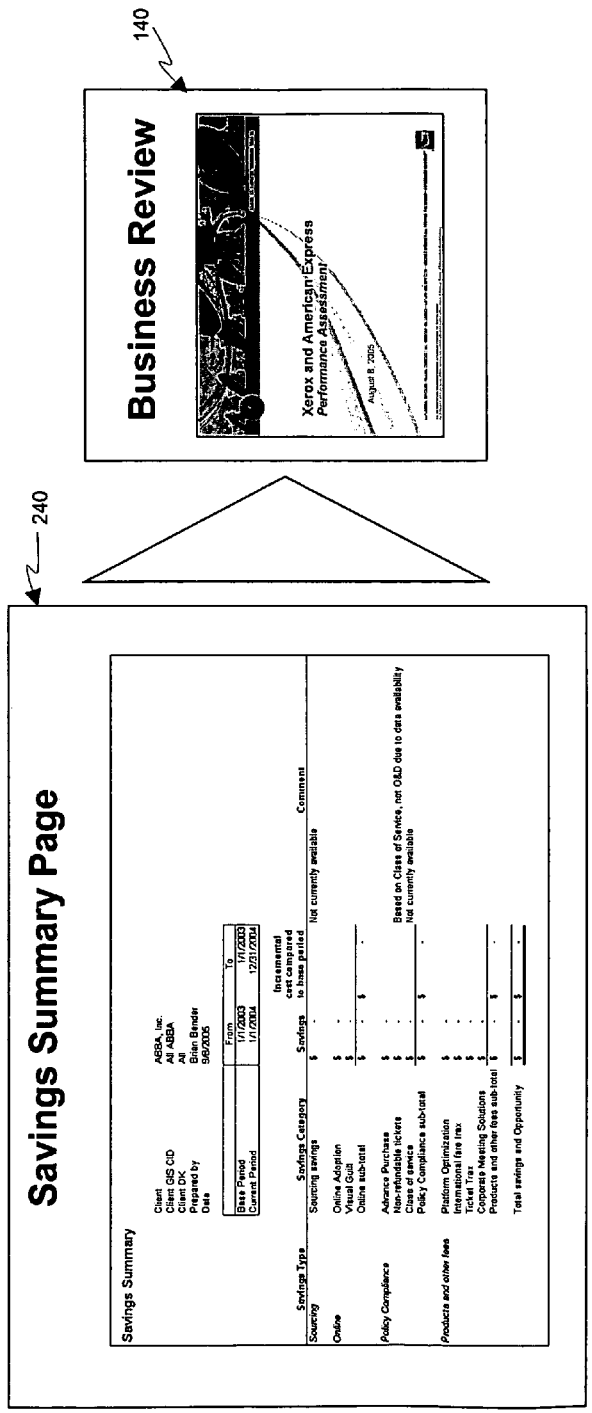
FIG. 6 is a diagram showing how the savings summary report is integrated into the business review according to one embodiment of the present invention.

The savings summary report 240 is included in the business review report 140, as shown in FIG. 6, to illustrate the calculated savings realized over the period of time for each of the categories of expenses. The inclusion of the savings summary report 240 in the business review report 140 helps demonstrate the value provided to the travel customer.

III. Process

The categories of expenses, shown in overview as 520 in FIG. 5, and the respective pre-defined formulas, 530 in FIG. 5, used to calculate the savings realized for certain of the categories of expenses are shown in detail in FIGS. 7-10.

Figure 7:
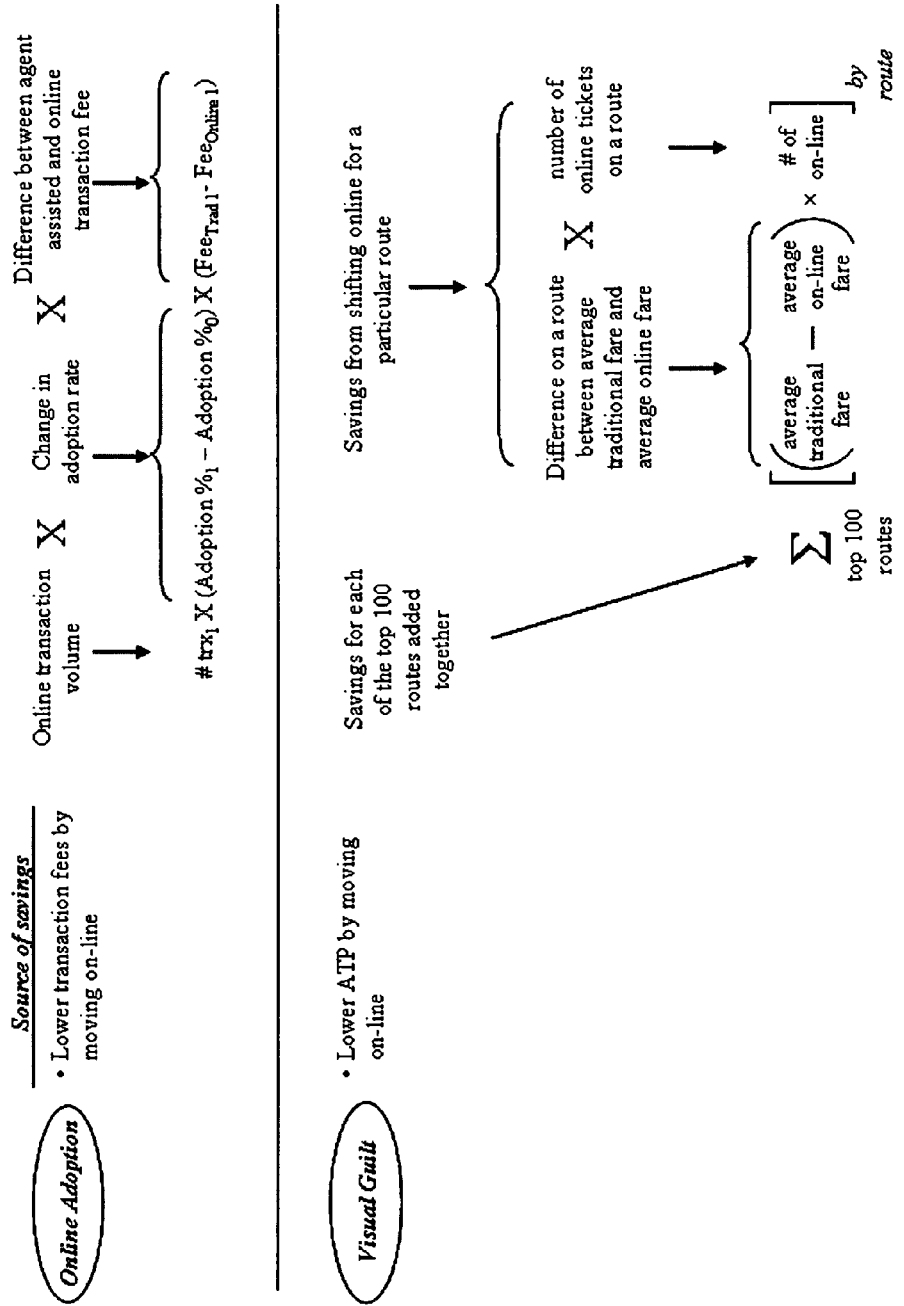

In particular, FIG. 7 shows the formulas for calculating the "Online Adoption" savings category, which shows the user how much more can be saved depending on what percentage of ticket purchase is performed on-line. In addition, as shown in that Figure, savings calculator 230 provides an output (termed "Visual Guilt" in this embodiment) which helps show how much can be saved by using on-line ticket purchasing (the savings achievable by always buying on-line for the top 100 routes is calculated and displayed).

Figure 8:
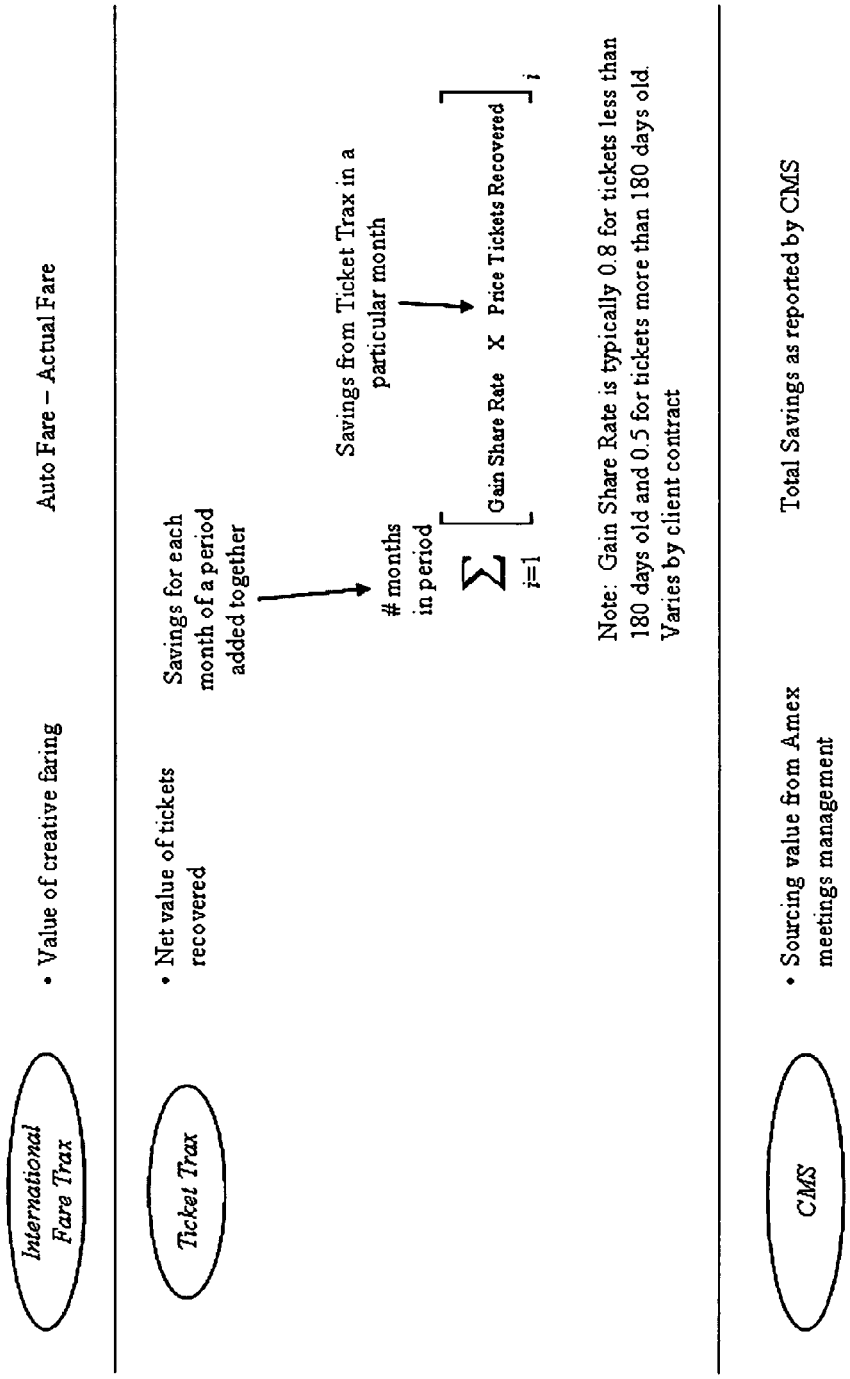

FIG. 8 shows the formulas for calculating the "International Fare Trax," "Ticket Tracker," and "CMS" saving categories.

"International Fare Trax" is a product offered by the travel services provider to clients for finding them the lowest possible international fare by using experts having detailed knowledge of fare rules and restrictions of airlines around the world. The "Auto Fare" variable used in the formula for calculating the savings generated by the "International Fare Trax" savings category relates to the first-pass airfare returned from an automated booking engine for an international travel itinerary.

The "Gain Share Rate" variable used in the formula for calculating the savings generated by the "Ticket Tracker" savings category is the contracted fraction (e.g., 0.8 for tickets less than 180 days old and 0.5 for tickets more than 180 days old) of the value of recovered, unused airline tickets, that the travel services provider passes on to the client.

"CMS" is an advisory group within the travel services provider organization that provides consulting advice to clients for reducing their group travel expenses.

Figure 9:
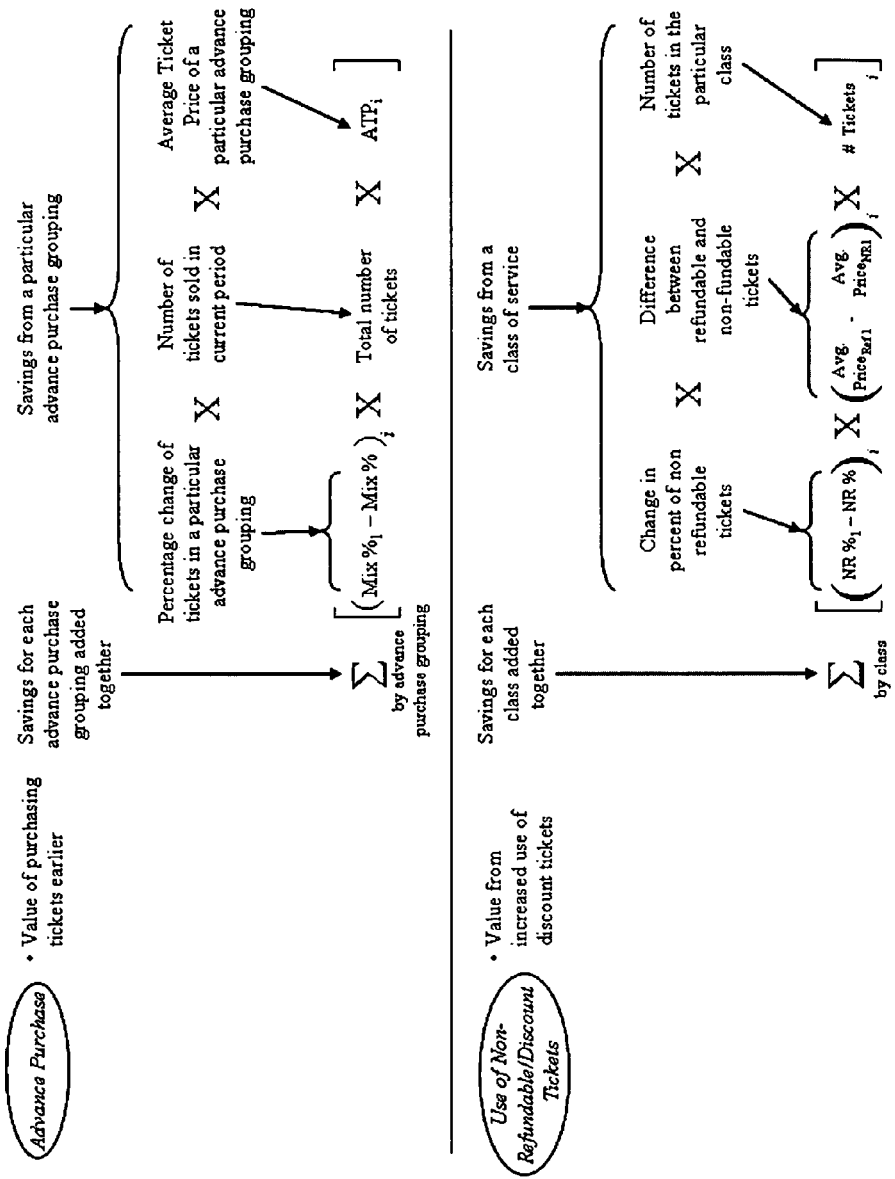

FIG. 9 shows the formulas for calculating the "Advance Purchase" and "Use of Non-Refundable/Discount Tickets" savings categories, and FIG. 10 shows the formula for calculating the "Platform Optimization" savings category.

Of course, these categories are only examples, and others could be adopted instead or in addition. Whatever categories are used, they should be mutually exclusive so that no savings are counted more than once.

IV. Example Implementations

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein, which form part of the present invention. Rather, the operations are machine operations. Useful machines for performing the operation of the present invention include general-purpose digital computers or similar devices.

Figure 11:
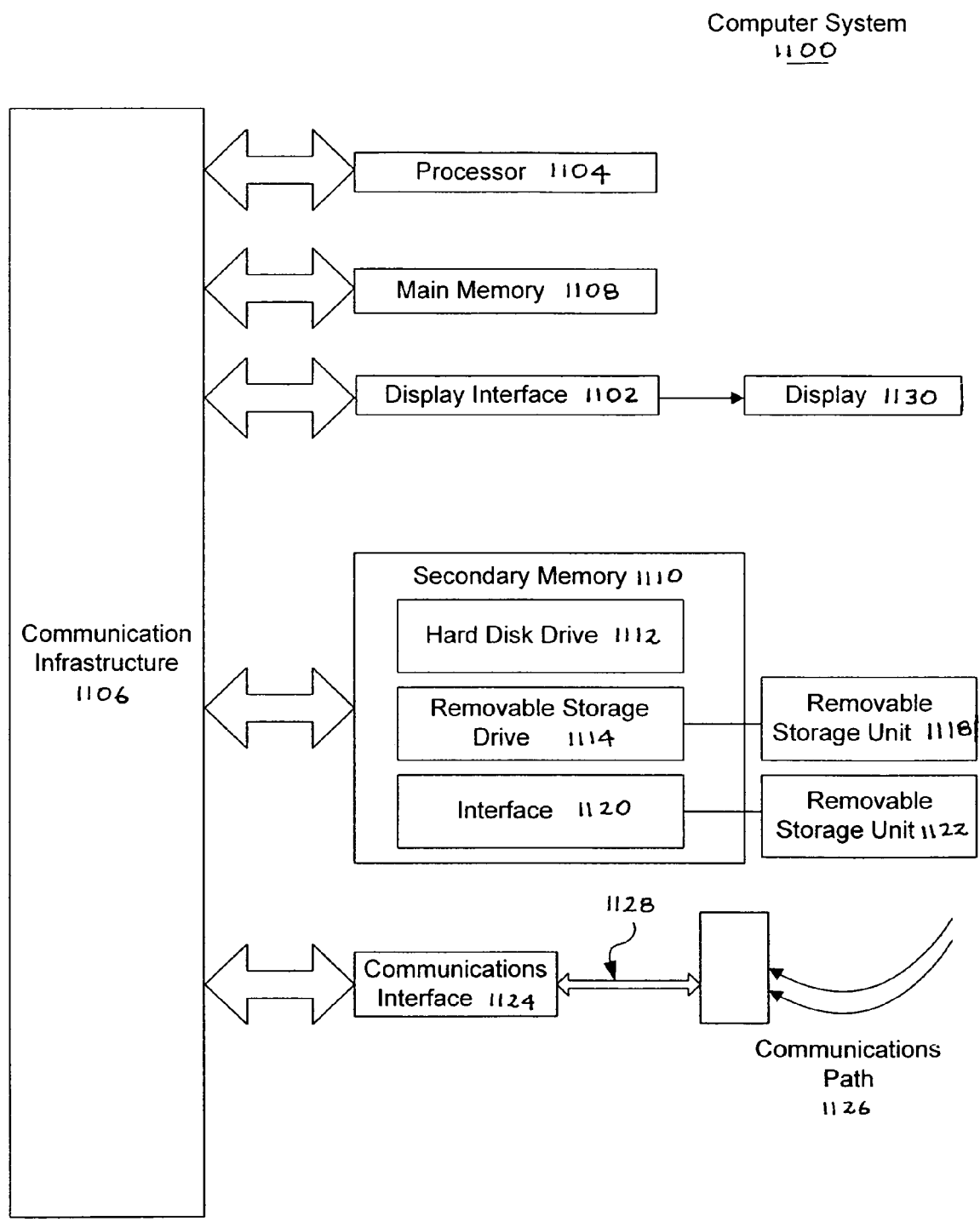
FIG. 11 is a block diagram of an exemplary computer system useful for implementing the present invention.

In fact, in one embodiment, the invention is directed toward one or more computer systems capable of carrying out the functionality described herein. An example of a computer system 1110 is shown in FIG. 11.

The computer system 100 includes one or more processors, such as processor 1104. The processor 1104 is connected to a communication infrastructure 1106 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1100 can include a display interface 1102 that forwards graphics, text, and other data from the communication infrastructure 1106 (or from a frame buffer not shown) for display on the display unit 1130.

Computer system 100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118 represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar devices for allowing computer programs or other instructions to be loaded into computer system 100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCM-CIA) slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (e.g., channel) 1126. This channel 1126 carries signals 1128 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1114 and a hard disk installed in hard disk drive 1112. These computer program products provide software to computer system 1100. The invention is directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features of the present invention, as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
   receiving, by a computer-based system for calculating savings, raw data;
   categorizing, by the computer-based system, the raw data into a plurality of categories of data, each category of data corresponding to one of a plurality of pre-defined variables, the plurality of pre-defined variables comprising an online transaction volume, a change in adoption rate, and a difference between an agent assisted transaction fee and an online transaction fee;
   multiplying, by the computer-based system, the online transaction volume, by the change in adoption rate and by the difference between the agent assisted transaction fee and the online transaction fee, to obtain a savings between the agent assisted transaction fee and an online travel reservations;
   displaying, by the computer-based system, the savings to a customer; and
   receiving, by the computer-based system, an online travel reservation from the customer in response to the displaying the savings.

2. A system comprising:
   a processor for calculating savings,
   a tangible, non-transitory memory configured to communicate with the processor,
   the tangible, non-transitory memory having instructions stored thereon that, in response to execution by the processor, cause the processor to capable of performing operations comprising:
   receiving, by the processor, raw data;
   categorizing, by the processor, the raw data into a plurality of categories of data, each category of data corresponding to one of a plurality of pre-defined variables, the pre-defined variables comprising an online transaction volume, a change in adoption rate, and a difference between an agent assisted transaction fee and an online transaction fee;
   multiplying, by the processor, the online transaction volume, by the change in adoption rate and by the difference between the agent assisted transaction fee and the online transaction fee, to obtain a savings between the agent assisted transaction fee and an online travel reservations;
   displaying, by the processor, the savings to a customer; and
   receiving, by the computer-based system, an online travel reservation from the customer in response to the displaying the savings.

3. An article of manufacture including a non-transitory, tangible computer readable storage medium having instructions stored thereon that, in response to execution by a computer-based system for calculating savings, cause the computer-based system to be capable of performing operations comprising:
   receiving, by the computer-based system, raw data;
   categorizing, by the computer-based system, the raw data into a plurality of categories of data, each category of data corresponding to one of a plurality of pre-defined variables, the pre-defined variables comprising an online transaction volume, a change in adoption rate, and a difference between an agent assisted transaction fee and an online transaction fee;
   multiplying, by the computer-based system, the online transaction volume, by the change in adoption rate and by the difference between the agent assisted transaction fee and the online transaction fee, to obtain a savings between the agent assisted transaction fee and an online travel reservations;
   displaying, by the computer-based system, the savings to a customer; and
   receiving, by the computer-based system, an online travel reservation from the customer in response to the displaying the savings.

4. The method according to claim 1, further comprising guiding, by the computer-based system, a user by displaying where to find certain items of information.

5. The method according to claim 1, wherein the calculating includes performing, by the computer-based system, one calculation that produces an intermediate result and another calculation that produces a final result, and displaying, by the computer-based system, the intermediate result to a user and the final result to the user.

6. The method according to claim 1, further comprising displaying, by the computer-based system, a glossary to a user to provide definitions of terminology.

7. The method according to claim 6, wherein the displaying the glossary includes displaying, by the computer-based system, an explanation of calculations performed.

8. The method according to claim 6, wherein the displaying the glossary includes displaying, by the computer-based system, an explanation of significance of results shown in a summary report.

9. The system according to claim 2, further comprising guiding, by the processor, a user by displaying where to find certain items of information.

10. The system according to claim 2, wherein the calculating further comprises performing, by the processor, one calculation that produces an intermediate result and another calculation that produces a final result and displaying, by the processor, the intermediate result to a user and the final result to the user.

11. The system according to claim 2, further comprising displaying, by the processor, a glossary to a user to provide definitions of terminology.

12. The system according to claim 11, wherein said the displaying includes displaying, by the processor, an explanation of calculations performed.

13. The system according to claim 11, wherein the displaying includes displaying, by the processor, an explanation of significance of results shown in a summary report.

14. The article according to claim 3, further comprising guiding, by the computer-based system, a user by displaying, by the computer-based system, where to find certain items of information.

15. The article according to claim 3, wherein the calculating includes performing, by the computer-based system, one calculation that produces an intermediate result and another calculation that produces a final result, and displaying, by the computer-based system, the intermediate result to a user and the final result to the user.

16. The article according to claim 3, further comprising displaying, by the computer-based system, a glossary to a user to provide definitions of terminology.

17. The article according to claim 16, wherein the displaying the glossary includes displaying, by the computer-based system, an explanation of calculations performed.

18. The article according to claim 16, wherein the displaying the glossary includes displaying an explanation of significance of results shown in a summary report.

* * * * *